United States Patent [19]

Berry

[11] 4,065,869
[45] Jan. 3, 1978

[54] FISHING DOWN-RIGGER VANE AND RELEASE

[75] Inventor: Arthur E. Berry, Lathrup Village, Mich.

[73] Assignee: Madeline E. Berry, Lathrup Village, Mich.

[21] Appl. No.: 413,875

[22] Filed: Nov. 8, 1973

[51] Int. Cl.² ............................................. A01K 91/00
[52] U.S. Cl. ........................................ 43/43.12; 43/17
[58] Field of Search ............................. 43/43.12, 43.13

[56] References Cited

U.S. PATENT DOCUMENTS

| 2,735,212 | 2/1956 | Baum | 43/43.12 |
| 2,988,395 | 6/1961 | Rogers | 43/43.12 X |

Primary Examiner—Russell R. Kinsey
Assistant Examiner—Daniel J. Leach
Attorney, Agent, or Firm—William T. Sevald

[57] ABSTRACT

A down-rigger trolling for attachment between a weight and a cable wherein the vane has a nose adjacent the cable connections and a tail remote from the connections so that the tail trails directing the vane nose-foremost and a fish-line release device mounted on or attached to the back of the vane rearwardly of cable attachment and positioned for release by the nose-foremost travel of the vane. The release device comprises a leg, a prong on the leg, and a spring arm which has a looped end releaseably engaging the prong. The leg, prong, and arm form a trap for a ring which is connected to a fish-line between the rod and the bait. Pull by a fish on the bait displaces the looped end of the spring arm off the prong opening the trap and releasing the ring thereby freeing the fish-line, bait, and fish from the down-rigger. Conversely the release device may be mounted to be released with the fish-line from an eye fixed on the vane. The vane may have a pulley sheave for leading the down-rigger cable down from and back to a hoist to double the weight handling ability of the hoist. The sheave engagement with the cable urges the vane toward lying parallel with the beam of the hoist which is transverse to the trolling direction, but the tail of the vane urges the vane toward parallel of the trolling direction so that the vane takes an intermediate plowing angular position with the vane facing obliquely sidewardly outwardly of the boat when trolled moving the entire assembly away from the boat.

16 Claims, 13 Drawing Figures

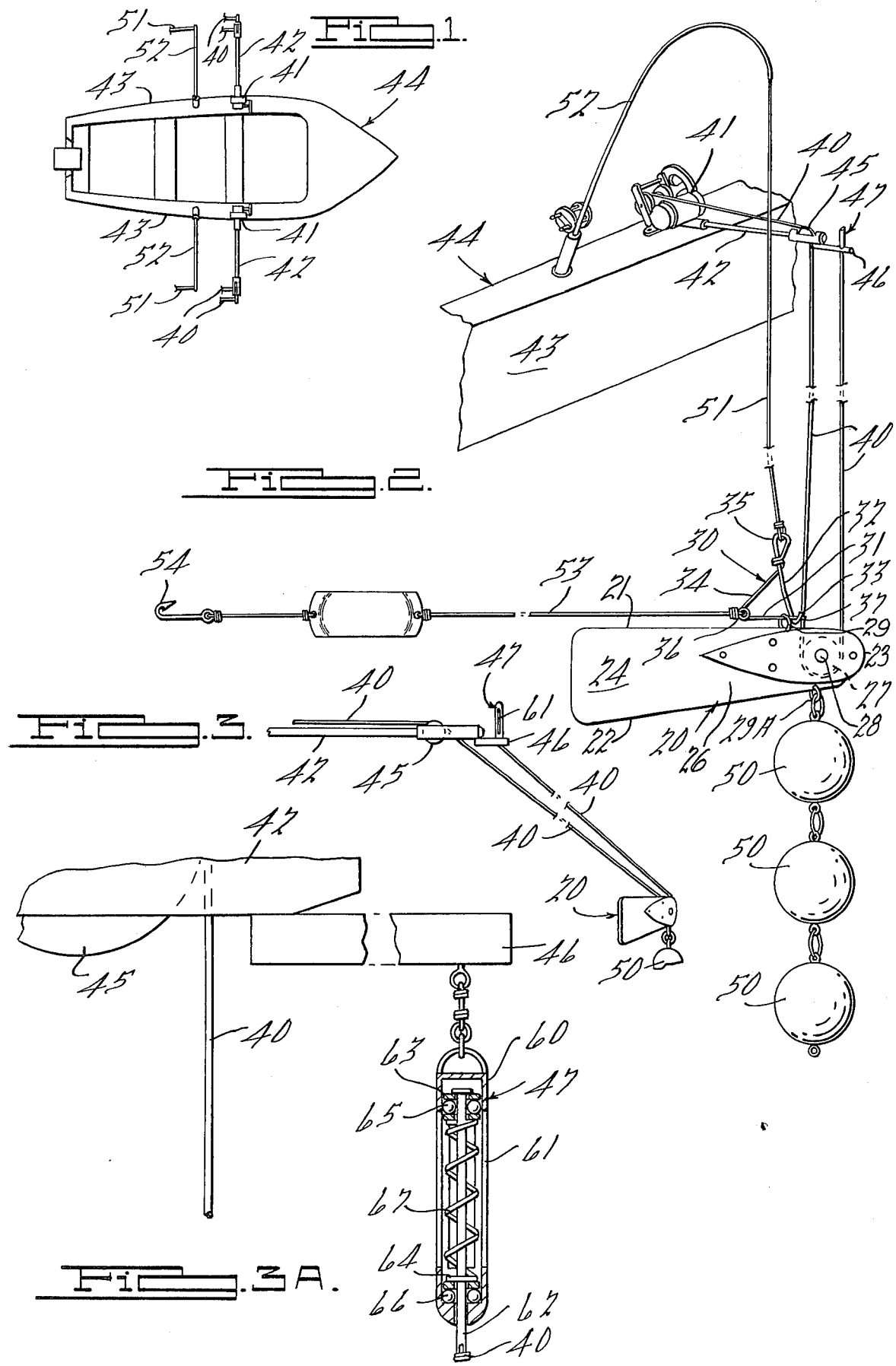

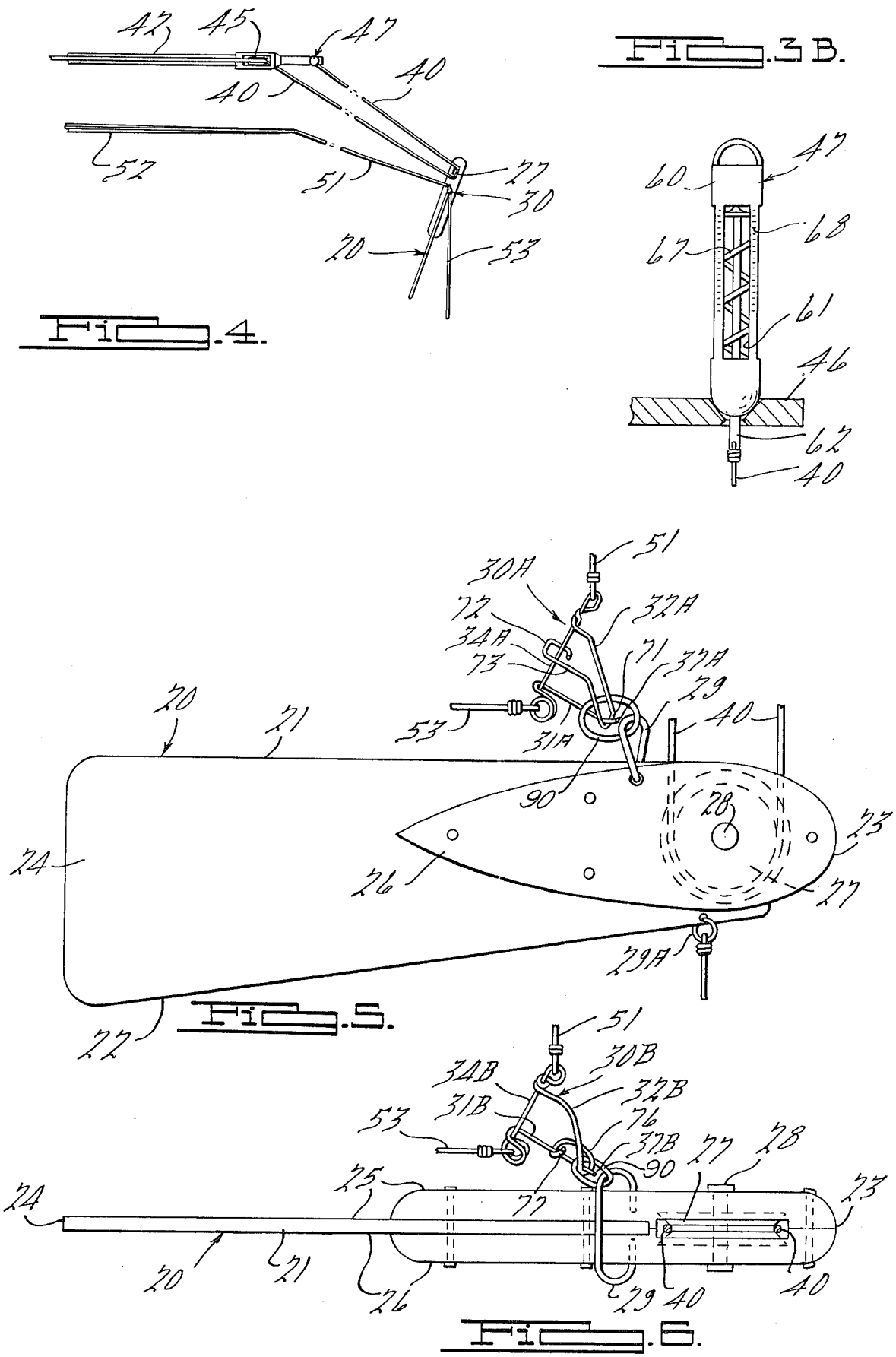

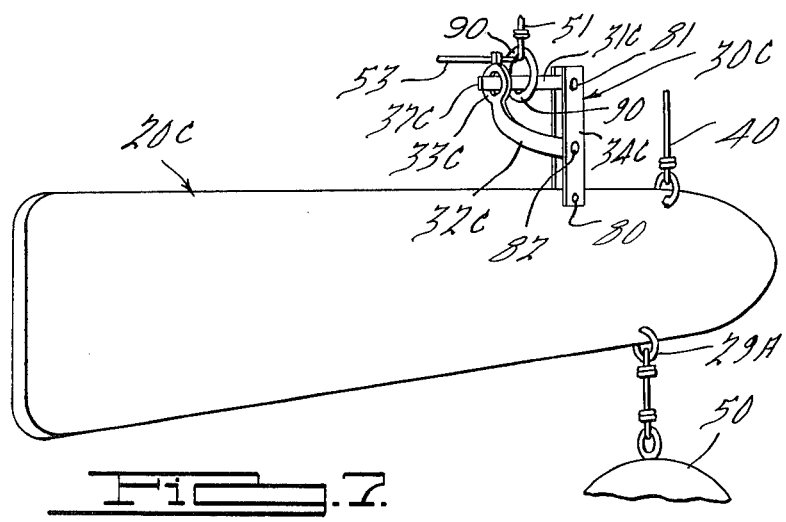
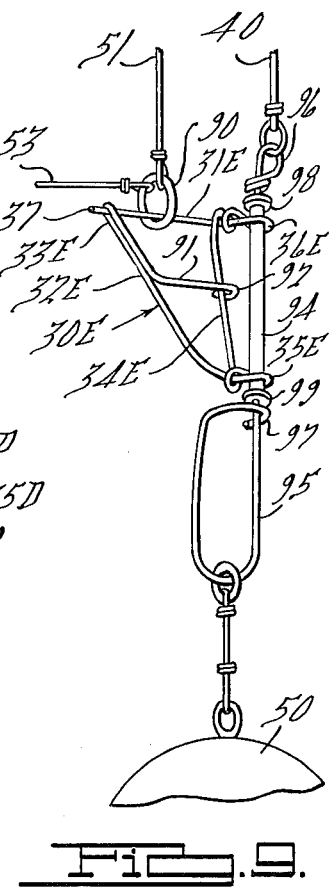
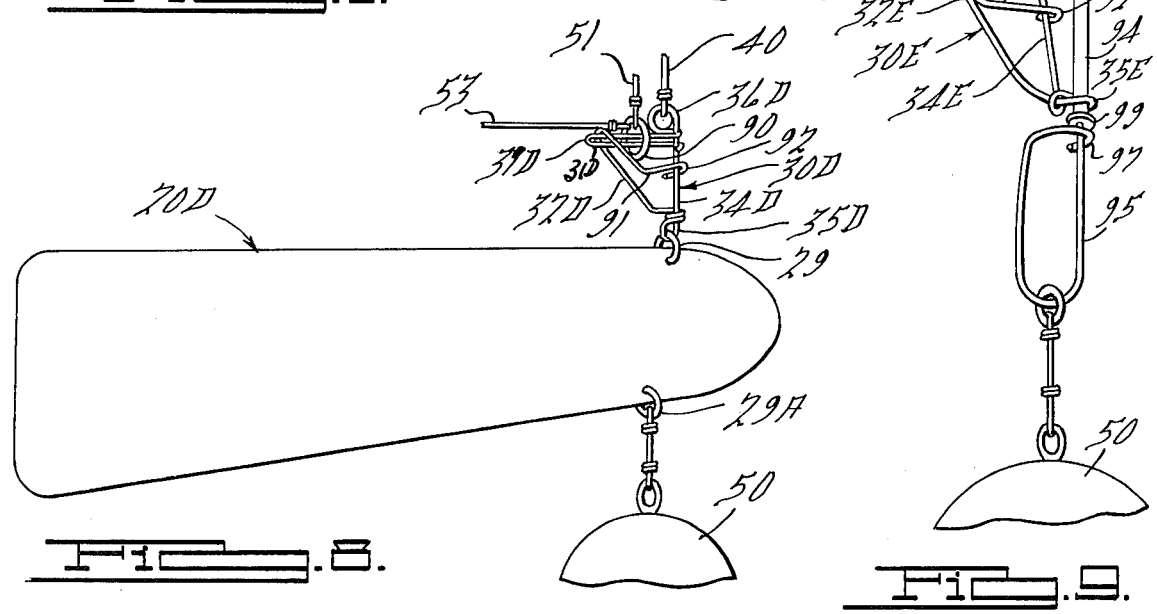
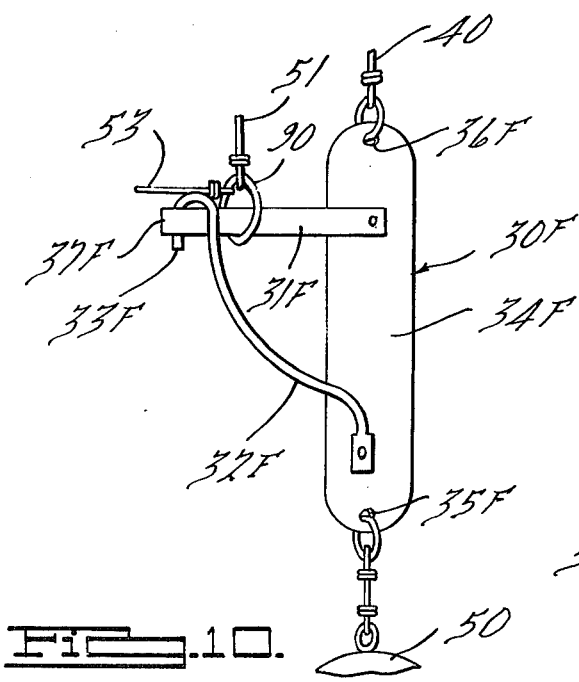
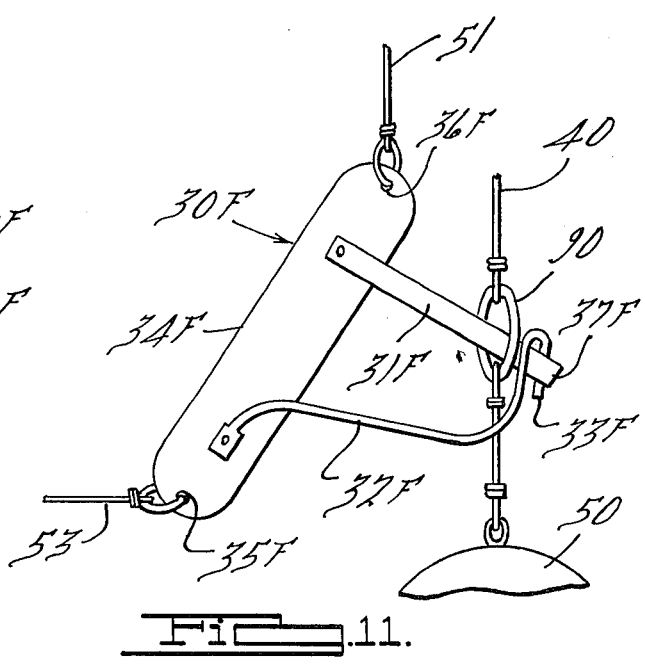

FISHING DOWN-RIGGER VANE AND RELEASE

BACKGROUND OF THE INVENTION

In deep water sport trolling at depths of about 100 to 300 feet for example, a fish-line sinker and bait cannot be used by themselves because they will not sink more than about 50 feet, because of the line floating and planing and because a heavy enough sinker cannot be used since it would be too much incumbrance upon hooking a fish. Thus a down-rigger is used to sink the fish-line and bait to the desired depth and a release device is used to allow the fish-line and bait to separate from the down-rigger when a fish is hooked on the bait, so that the fisherman has only the line, bait, and fish on his rod. A hoist, such as a hand-reel or a power-reel, has a beam extending over the side of the boat and a cable leads from the hoist to the end of the beam over a pulley and then downwardly to the weight which is usually one or more eight pound balls of lead. The release device is attached near the weight. The fish-line is attached to the weight or cable by a release device and the cable and fish-line are payed out at the same time with the weight to sink both to the desired depth. A length of fish-line or a leader trails from the release device to the bait.

However, with the prior art devices, the release device is such that it releases with about the same comparatively light force of pull from either the bait or the rod. Thus the fish-line cannot be tightened between the down-rigger and the rod and as a result the fish-line bows out rearwardly between the rod and the down-rigger providing too much slack in the line when a fish takes the bait. This slack prevents the angler from setting the hook in the fish without delay, gives the fish time delay to throw the hook, and delays the indication to the rod that the bait has been taken by a fish.

The round lead balls of the prior art used as down-rigger weights tend to come together aft of the boat and tangle the cables, lines, and baits. Also the prior art release devices on the pull of the rod let the fish-line detach without a fish on the bait and when this happens, the whole apparatus must be raised, reconnected, and again lowered.

SUMMARY OF THE INVENTION

The instant invention provides a down-rigger vane for directing the weight and cable directly forwardly and/or sidewardly outwardly to prevent down-riggers trolled on both sides of a boat from coming together and tangling and also to increase the distance between baits to cover more area.

The vane has a sheave pulley and the cable from the hoist thus enters the vane at one point and leaves it at another spaced point so that directional influence is imposed on the vane by the angle of the cable at the spaced points. Here the hoist beam extends over the side of the boat and the cable descends to the sheave pulley in the vane from one point and ascends to the beam at another point spaced from the one point so that the cable points at the beam are transverse of the line of the boat travel. The vane while the boat is standing still, will face directly outwardly. However, under trolling motions, the tail of the vane turns the vane to a forwardly oblique angle against the influence of the cable causing the vane to plow sidewardly outwardly from the boat in trolling.

With the sheave pulley in the vane, the power of the hoist to handle the sinker weights is doubled by the inherent mechanical advantage and thus two or more eight pound weights may be used on the down-rigger assembly. This gives greater sinking force to sink the cables and fish-line to greater depth in the water without excessive trailing angle in the trolling so that the bait is deployed at the desired depth without excessive increase in line and cable length occasioned by a large trailing angle.

The release device is constructed to release with pull on the bait at fish engagement force and to resist release with pull from the rod. Thus pull from the rod on the line to the release device will not detach the line from the down-rigger. This enables line to the pole to be tightened to take the bow out of the line to eliminate the slack so that when a fish takes the bait, it is quickly signaled to the angler and he can immediately set the hook and bring in the fish.

The release device comprises a leg, a prong projection from the leg, and a spring arm fixed on the leg triangulating to a point adjacent the outer end of the prong whereat the spring arm has a looped end of either circular or hook conformation normally engaging the outer end of the prong. The leg, prong, and arm form a trap cage for retaining a ring. The releasing device is so oriented that pull on the ring from the bait is against the spring arm whereas pull on the ring by the rod is on the prong. Since the device only releases when the spring arm is bent or flexed to pull off the prong, only pull on the bait pulls the spring arm off the prong to release the ring whereas pull on the ring by the rod is resisted by the prong and supported by the spring arm preventing release of the ring.

The release device has two optional positions: (1) where the release device is released with the fish-line from the ring which remains with the down-rigger, and (2) where the release device remains with the down-rigger and the ring is released with the fish-line.

DESCRIPTION OF THE DRAWINGS

FIG. 1 is a top plan view of a power boat equipped with out-rigger hoists and fishing rods on both sides.

FIG. 2 is an enlarged partial perspective view of the starboard side of the boat of FIG. 1, with parts broken away, including the down-rigger hoist and fishing rod and additionally showing the down-rigger trolling vane, sinker weights, cable shock absorber, fish-line release device, and a bait, with the down-rigger cable and fish-line foreshortened.

FIG. 3 is a partial rear elevational view of the down-rigger hoist and vane seen in FIG. 2, with the vane reduced in size and the weight broken away illustrating the outwardly plowing angle of the vane in trolling effected by the two cable lengths leading from spaced points at the shock absorber and the hoist pulley to the vane.

FIG. 3A is a partial enlarged side elevational view, with parts broken away, of the end of the hoist beam showing the shock absorber in longitudinal cross-section in an optional hanging position.

FIG. 3B is a view of the shock absorber seen in FIG. 3A, in the optional overhead position on the hoist beam.

FIG. 4 is a top plan view of the portions of the device seen in FIG. 3, showing the outward plowing angle of the vane from the top.

FIG. 5 is an enlarged side-elevational view of the vane of FIG. 2 and a modified release device.

FIG. 6 is a top plan view of the vane seen in FIG. 5, showing a second modified release device in side elevation.

FIG. 7 is an enlarged side perspective view of a modified vane, showing a modified release device integrally integrated therewith, and showing the weight, cable, and fish-line broken away.

FIG. 8 is a view similar to FIG. 7 showing a further modification of the release device.

FIG. 9 is an elevational view of a further modified release device located between the cable and weight, with the fish-line, cable, and weight broken away.

FIG. 10 is a side elevational view of a further modified release device connected in the cable between the hoist and the weight with the fish-line and cable broken away and wherein the fish-line releases from the device; and FIG. 11 is a side elevational view of the release device seen in FIG. 10 connected in the fish-line between the fishing rod and the bait with the fish-line and cable broken away and wherein the device releases with the fish-line from the cable.

DESCRIPTION OF THE PREFERRED EMBODIMENT

Referring now to the drawings wherein like reference numerals refer to like and corresponding parts throughout the several views, the trolling vanes and release devices disclosed therein singly and in combination to illustrate the invention comprise a vane 20 and a fish-line release device 30. The vane 20 has a top 21, a bottom 22, a nose 23, a fin tail 24, and opposite sides 25 and 26, FIGS. 2, 3, 5, and 6. A sheave 27 is rotatably mounted on an axle 28 lying between the opposite sides 25 and 26 at a point relatively close to the nose 23 and remote from the tail 24. An eye 29 is mounted over the top 21 for attachment to the release device 30 and an eye 29A is mounted similarly under the bottom 22 for attachment of sinker weights at a point preferably forwardly of the eye 29.

The release device 30 comprises a prong 31 inserted through the eye 29 with the end 37 of the prong 31 projecting past the eye 29, a spring arm 32 having a looped end 33 engaging the projecting end of the prong 31, and a triangulating leg 34 interconnecting with the prong 31 and spring arm 32 at a point remote from the projecting end 37 and looped end 33, respectively. In the device 30, a twisted loop 35 interconnects the leg 34 and spring arm 32 and forms an aperture; a twisted loop 36 interconnects the prong 31 and the leg 34 and forms an aperture. The twisted loops 35 and 36 provide apertures for attaching fish-line or sinker weight cable to the release device 30.

The vane 20 and release device 30, FIGS. 1-4, are trolled through the water by a cable 40 controlled by a manual or power hoist 41. The hoist 41 has a beam 42 extending over the side 43 of a boat 44. The cable 40 leads over a pulley wheel 45 on the beam 42, descends to the vane 20, turns around the sheave 27, and rises to the outer end 46 on the beam 42 and is attached to a shock absorber 47. One or more sinker weights 50 of about eight pounds of lead each are attached to the eye 29A and sink the cable 40, vane 20, and release device 30 relatively directly downwardly of the boat with minimal back angle and bowing of the cable 40 with trolling motion to achieve the desired depth on a relatively straight line downwardly rather than the usual trolling angle of a fish-line which is far more rearwardly than downwardly.

The fish-line 51 leads from the rod 52 downwardly to the release device 30 and is attached to the loop 35. A bait leader 53 and hook 54 attach to the release device 30 at the loop 36. The rod 52 exerts upward pull on the line 51 to prevent back bowing of the line 51 when trolling. The pull of the rod 52 engages the looped end 33 of the spring arm 32 in tension against the prong 31 without any torsional flexing of the spring arm 32. Upon a fish taking the hook 54, the fish pull is torsionally against the looped end 33 of the spring arm 32 as it is butted against the eye 29 and this flexes the spring arm 32 out of engagement with the projecting end 37 of the prong 31 allowing the eye 29 to pass therebetween thereby disconnecting the release device 30 from the vane 20 together with the fish on the hook 54 and the line 51 to the rod 52 thus enabling the angler to play the fish free of the vane 20, weights 50, and cable 40.

The shock absorber 47, FIGS. 3, 3A, and 3B comprises a case 60 having side windows 61, an axial shaft 62, an upper flane 63 on the shaft 62, a lower flange 64 slidably and pivotally engaging the shaft 62, ball bearing races 65 and 66 adjacent the flanges 63 and 64, respectively, and a coil spring 67 lying between the races 65 and 66. Tension imposed on the shaft 62 by the cable 40 is resiliently resisted by the spring 67 and torsional twist imposed on the shaft 62 by the cable 40 is released by the shaft 62 and flanges 63 and 64 spinning on the races 65 and 66 thereby taking twist out of the cable 40. The supporting pull by the cable 40 on the shaft 62 depresses the spring 67 and upper flange 63 into the area of the windows 61. The graduation marks 68 on the side of the case 60 gives the angler indication of the relative pull which is desirable in trolling as speed imposes tension on the cable as well as the weights 50. Upon the weights 50 or vane 20 striking rocks, etc., the spring 67 absorbs the shock on the cable 40. The window 61 also provides the angler with a visual indication of the remainder of shock absorbing resiliency in the spring 67 when under trolling load. The strength of the spring 67 is calibrated relative to the imposed load and the shock absorber is easily replaced with another having a stronger or weaker spring to suit the load and trolling speed.

The modified release device 30A of FIG. 5 has a spring arm 32A with a U-shaped loop 71 engaging the end 37A of the prong 31A and a return loop portion 72 loosely engaging the leg 34A. Under heavy pull from the leader 53, the loop portion 72 abuts the leg 34A preventing the pull of the bait from inadvertently flexing the spring arm 32A to release the eye 29.

The modified release device 30B of FIG. 6 has a spring arm 32B with a U-shaped loop 76 engaging the end 37B of the prong 31B. the loop 76 has a terminal end 77 slidably looped around the prong 31B forming a confining enclosure for the ring 90 so that it is located at the junction of the spring arm 32B and the prong 31B at the release point.

The modified vane 20C and the modified release device 30C of FIG. 7 are structured in integral combination wherein the leg 34C may be bifurcated as shown and riveted or otherwise fixedly mounted at 80 on the vane 20C. The prong 31C extends tailwardly from the upper end of the leg 34C at 81. The spring arm 32C extends from the leg 34C at the point 82 and has a looped end 33C of circular formation on the prong 31C. A ring 90 engages the prong 31C and abuts and is contained by the looped end 33C of the spring arm 32C.

The fish-line 51 and bait leader 53 are attached to the ring 90 and the ring 90 departs the vane 20C and from the release device 30C when the pull of a fish impinges the ring 90 against the looped end 33C with force to flex the spring arm 32C to move the looped end 33C past the end of the prong 31C to separate their ring containing interconnection. This modification differs from the proceeding embodiments where the release device departs with the fish-line 51 and leader 53.

The modified vane 20D and modified release device 30D of FIG. 8 are integrated in the cable 40 to stay together upon release of the fish-line 51 as in the preceeding embodiment just described. The cable 40 is connected to the eye 36D at one end of the leg 34D and the eye 35D, at the other end of the leg 34D, is connected to the vane 20D. The ring 90 overlies the prong 31D which is reversely bent to the leg 34D. The spring arm 32D loops around the end 37D of the prong 31D and has a return span 91 loosely engaging the leg 34D at 92. The return span 91 contains the ring 90 on the prong 31D and also reinforces the spring arm 32D against heavy bait pull and is adapted to flex with the spring arm 32D upon the added pull of a fish to release the ring 90 at the end 37D of the prong 31D with the fish-line 51.

The modified release device 30E seen in FIG. 9 is similar to the release devices seen in FIGS. 2 and 8, but with the looped ends 35E and 36E lying in axial alignment substantially normal to the leg 34E. A tube 94 lies in the looped ends 35E and 36E and a shaft 95 lies in the tube 94. The shaft 95 has an eye 96 at its upper end for attachment to the cable 40 and an eye 97 at its lower end for attachment to the weight 50. Washers 98 and 99 lie between the ends of the tube 94 and the eyes 96 and 97 eliminating interference with the loops 35E and 36E on the release device 30E. The release device 30E is thus swivelly mounted on the shaft 95 so that it assumes a position facing rearwardly as shown under the drag of the leader 53 and fish-line 51. This also allows the shaft 95, cable 40, and weight 50 to rotate relative to the release device 30E to release twist in the cable 40.

The modified release device 30F of FIGS. 10 and 11, comprises a leg 34F having an aperture 36F at one end and an aperture 35F at the other end, a prong 31F projecting sidewardly from the leg 34F, and a spring arm 32F having a looped end 33F engaging the prong 31F adjacent its outer end 37F. The ring 90 surrounds the prong 31F and is releasably held thereon by the looped end 33F of the spring arm 32F. In the hook-up of FIG. 10, the cable 40 is attached to the aperture 36F of the leg 34F. The fish-line 51 and the leader 53 are attached to the ring 90. In the hook-up of FIG. 11, the fish-line 51 is attached to the aperture 36F of the leg 34F and the leader 53 is attached to the aperture 35F of the leg 34F. The cable 40 is attached to the top of the ring 90 and the weight 50 is attached to the bottom of the ring 90. The prong 31F is inserted in the ring 90 and the looped end 33F of the spring arm 32F is placed on the end 37F of the prong 31F releasably holding the release device 30F on the ring 90. With the hook-up of FIG. 10, the release device 30F remains with the cable 40 and weight 50 and the ring 90 is released and departs with the line 51 and leader 53 upon hooking a fish. With the hook-up of FIG. 11, the ring 90 remains with the cable 40 and weight 50 and the release device 30F is released off the ring 90 and departs with the line 51 and leader 53 upon hooking a fish.

DESCRIPTION OF THE OPERATION OF THE INVENTION

The angler mounts the hoist 41 with its beam 42 extending sidewardly outwardly of the boat and leads the cable 40 from the hoist pulley 45 around the vane sheave 27 and back to the shock absorber 47 on the end of the beam 42 spaced from the hoist pulley 45. The hoist cable 40 and the vane sheave 27 thus orient the vane 20 pointing sidewardly outwardly of the boat 44. He then attaches the weight 50 to the vane 20 and engages the release device 30 in the eye 29 of the vane 20 which release device 30 has previously been tied to the fish-line 51 and bait leader 53. The angler then starts the boat 44 moving and release device 30 has previously been tied to the fish-line 51 and bait leader 53. The angler then starts the boat 44 moving and activates the hoist 41 to pay out cable 40 and the weight 50 sinks the vane 20, cable 40, release device 30, bait leader 53, and the fish-line 51 which the angler pays out with the rod 52 as the vane 20 descends to the desired depth in the water. Upon reaching the desired depth, the angler reels back on the fish-line 51 to reduce its rearward bow to a desired minimum and this bends the rod 52, such as seen in FIG. 2. This pull of the fish-line 51 is exerted axially on the spring arm 32 and transversely to the prong 31 urging the looped end 33 of the spring arm 32 into connecting engagement with the end 37 of the prong 31 so that this force does not tend to effect release of the device 30.

Due to the fact that the weight eye 29A is slightly aft of the sheave axle 28 and the eye 29 is slightly aft of the eye 29A as shown, the pull of the fish-line 51 is resisted by a portion of the pull of the weight 50 so as to properly level the vane 20 under the several forces.

Under water resistance, the tail 24 during trolling motion is forced rearwardly against the transverse influence of the two strands of cable 40 at the sheave 27 which tend to position the vane 20 facing sidewardly. Under these two opposing forces the vane 20 assumes an angular position facing slightly outwardly of the side of the boat 44 so that the vane 20 plows sidewardly outwardly of the side of the boat 44 as seen in FIGS. 3 and 4. Thus the down-rigger and fish-line assemblies on either side of the boat 44 move sidewardly outwardly away from one another when trolling which overcomes their natural tendency to come together by their mutual physical attraction. This reduces the possibility of tangled lines.

When a fish strikes the hook 54, the added pull on the leader 53 is directed axially of the prong 31 and transversely of the spring arm 32 which flexes the spring arm 32 and moves its looped end 33 past the end 37 of the prong 31 allowing the release device 30 to escape from the eye 29 with the fish-line 51, leader 53, hook 54, and the fish whereupon the rod 52, being relieved of a portion of the pull of the weight 50, springs upright from the bent position seen in FIG. 2, signalling the angler that the line 51 is released from the down-rigger assembly and has a fish hooked. Thereupon the angler handles the rod 52, and the hoist 41 is manually or power actuated to raise the down-rigger vane 20 and weight 50 clear of the fish.

During the trolling, the shock absorber 47, attached in either position of FIG. 3A or FIG. 3B, provides a resilience to the cable 40 to compensate for shocks such as striking rocks, etc., and also provides the angler with visual indication of the pull force on the cable 40 by reading the flange 63 or top of the spring 67 against the graduation marks 68 on the case 60. This pull force reading is also useful in setting the tension in the fish-line 51 for trolling as this tension releases weight pull on the cable 40 and the spring 67 is responsive thereto. Thus the angler can gauge the force of the pull of the fish-line 51 as he tensions it by reading the position of the spring 67.

In the release device 30A of FIG. 5, the spring arm extension 73 from the U-shaped loop 71 terminates in the looped end 72 around the leg 34A. When large baits and lures are used, especially those which dive and dart at sharp angles, added forces are imposed suddenly on the leader 53 transversely of the spring arm 32A. The looped end 72, upon suddenly imposed added force, abuts the leg 34A and supports the spring arm 32A from flexing to the point of release thereby preventing accidental disconnection. However, with the pull of a fish, both the spring arm 32A and the extension 73 to the looped end 72, flex to allow release.

The release device 30B of FIG. 6 has a spring arm 32B which has a looped end 76 with the extension 77 loosely slidably engaging the prong 31B. This extension 77 cages the eye 29 at the juncture of the prong 31B and the spring arm 32B so that the elements are secured in proper operating relationship.

The release device 30F of FIG. 11 has a leg 34F which is attached between the fish-line 51 and the leader 53. The prong 31F extends through a ring 90 which is attached to the cable 40 and the weight 50. The looped end 33F of the spring arm 32F engages the outer end 33F of the prong 31F and releasably holds the release device 30F on the ring 90 until a fish strikes and flexes the spring arm outer end 33F off the end 37F of the prong 31F, letting the prong 31F move out of the ring 90 thereby allowing the release device 30F to depart with the fish-line 51 and leader 53.

All the foregoing embodiments of the release device are hooked up and oriented to depart with the line 51 and leader 53. However, the release devices may be hooked up and oriented to remain with the down-rigger cable 40 and weight 50 and to release the ring 90 with the line 51 and leader 53 and this is now described relative to FIGS. 7 through 10.

In the release devices 30C to F of FIGS. 7 to 10, the fish-line 51 and leader 53 are attached to the ring 90 and the ring 90 surrounds the prong 31C to F, and when a fish strikes, the added pull on the leader 53 impinges the ring 90 against the looped end 33C to F of the spring arm 32C to F and flexes the spring arm looped end 33C to F outwardly of the end 37C to F of the prong 31C to F allowing the ring 90 to escape therebetween with the fish-line 51, leader 53, and the fish.

In the release devices 30D and E of FIGS. 8 and 9, respectively, the return extension portion 91 of the spring arm 32D and E from the U-shaped end 33D and E terminates in a loop 92 loosely engaging the leg 34D and E. This extension portion 91 and loop 92 give the spring arm 32D and E added support for heavy bait pull to prevent accidental disconnection of the ring 90 as previously described relative to FIG. 5.

It is clear from the foregoing that the invention disclosed and described includes release device structures and the vane structures singly and in combination with one another and it will be understood that the protective scope of the invention is defined in the appended claims.

I claim:

1. A combination trolling vane and fish-line release for down-rigging a fish-line for deep water trolling comprising,
    a vane having a nose, tail, top, and bottom;
    attaching means adjacent said nose for securing a cable to lower the vane in the water,
    attaching means on said bottom adjacent said nose for attaching a weight to sink said vane in the water,
    said tail thereby trailing said cable and weight attaching means to steer said vane nose-first through the water;
    a release device for integration with a down-rigger for releasably sinking a fish-line with heavy weight and trailing a bait, comprising,
    a leg having opposite ends equipped with attaching means for positioning said leg axially in tension between opposite forces in a hook-up,
    a prong on said leg lying substantially normal to said leg so as to lie substantially axially transverse to the tension axially exerted on said leg;
    said prong having a cantilevered outer end;
    a spring arm on said leg;
    said spring arm having a looped outer end transversely engaging said cantilevered outer end of said prong;
    said leg, prong, and spring arm thereby forming an enclosure for retaining a ring on said prong;
    a ring interconnecting said vane and said prong;
    said spring arm on said leg triangulating from a point on said leg remote to said prong to its said looped outer end engaging said prong at its said outer end;
    tension transferred to said spring arm from said leg being resisted by the transverse engagement between said looped end of said spring arm and said cantilevered end of said prong with the tension pulling them together in a direction transverse to the axis of said prong thereby urging them into interconnected relationship preventing escape of a ring from said enclosure;
    said spring arm being torsionally elastic to flex to locate its said looped outer end outwardly of said cantilevered end of said prong to provide an open space therebetween to permit the exit of a ring from said enclosure.

2. In a combination as set forth in claim 1, said eye being attached to said back of said vane and releasably trapped in said enclosure; said leg being attachable to a fish-line intermediate the rod and the bait.

3. In a combination as set forth in claim 1, a sheave on said vane lying adjacent said nose for receiving a cable from and leading a cable back to a hoist; said pulley sheave providing mechanical advantage to double the weight handling capacity of a hoist.

4. In a combination as set forth in claim 3, a hoist, a beam on each said hoist extending transverse to the travel of a boat, and a cable leading from said beam to said sheave on said vane and returning to said hoist thereby normally positioning said vane transverse to the travel of a boat; said tail on said vane in conjunction with travel through the water cocking said vane obliquely outwardly forwardly so that said vane moves sidewardly outwardly from a boat as a boat trolls said vane.

5. In a combination as set forth in claim 4, a case attached to said beam, a pin in said case, means for attaching a cable to said pin, and a spring in said case resiliently supporting said pin and said case relative to one another; said spring acting as a shock absorber for said cable and the position of said spring in said case when under load giving indication of the imposed load; said case having at least one side with a window opening therein for visually reading the position of said spring.

6. A trolling vane for down-rigging a fish-line for deep water fishing comprising a nose, a tail, a top, and a bottom,
attaching means adjacent said nose for securing a cable to lower said vane in the water;
attaching means on said bottom adjacent said nose for attaching a weight for sinking said vane;
said tail thereby trailing said cable and weight attaching means to steer said vane nose-first through the water;
a ring on said top rearwardly of said cable attaching means for connecting fish-line release means thereto for sinking the fish-line from the rod and for releasably trailing the bait.

7. In a device as set forth in claim 6, a pulley sheave on said vane constituting said cable attaching means;
said pulley sheave on said vane adjacent said nose for receiving a cable to a hoist; said pulley sheave providing mechanical advantage to double the weight handling capacity of a hoist.

8. In a device as set forth in claim 7, a sidewardly outer beam extending transverse to the travel of a boat, a sidewardly inner hoist aligned with said beam, and a cable leading from said beam to said pulley sheave on said vane and returning to said hoist thereby normally positioning said vane transverse to the travel of a boat; said tail on said vane in conjunction with travel through the water cocking said vane obliquely outwardly forwardly so that said vane moves sidewardly outwardly from a boat as a boat trolls said vane.

9. A release device for releasably interconnecting a down-rigger and a fish-line comprising,
a leg having opposite ends equipped with attaching means for connecting said leg to one of the down-rigger and fish-line;
a prong on said leg extending at an angle from said leg adjacent one said end of said leg;
said prong having a cantilevered outer end;
a spring arm on said leg;
said spring arm having a looped outer end transversely engaging said cantilevered outer end of said prong;
said leg, prong and spring arm thereby forming an enclosure for retaining an eye on said prong connected on the other of the fish-line and down-rigger;
said spring arm on said leg triangulating from a point on said leg remote to said prong to its said looped outer end engaging said prong at its said outer cantilevered end;
light pull by a bait transferred to said spring arm from an eye on said prong being resisted by the transverse engagement between said looped end of said spring arm and said cantilevered end of said prong;
said spring arm being torsionally elastic to flex to locate its said looped outer end outwardly of said cantilevered outer end of said prong to provide an open space therebetween to permit the exit of an eye from said enclosure upon the heavy pull of a fish on said fish-line to separate the connection between the fishing line and the down-rigger.

10. In a device as set forth in claim 9, one said end of said leg being attachable to a fish-line leading from a rod and said other end of said leg being attachable to a bait; and said enclosure being engagable with a ring attached to a down-rigger;
pull by a fish on a bait and on the ring flexing said spring arm out of engagement with said prong to disconnect said release device with the line from the ring on a down-rigger.

11. In a device as set forth in claim 9, one said end of said leg being attachable to a cable leading from a hoist and said other end of said leg being attachable to a weight; said enclosure being engagable by a ring on a fish-line between the rod and the bait;
pull by a fish on a bait against a ring flexing said spring arm out of engagement with said prong to disconnect the ring with the fish-line from said release device and the down-rigger.

12. In a device as set forth in claim 9, said spring arm being shaped to locate a ring at the juncture of said looped end of said spring arm and said cantilevered end of said prong.

13. In a device as set forth in claim 9, means forming a ring cage adjacent the juncture of said looped end of said spring arm and the cantilevered end of said prong to locate a ring at said juncture.

14. A combination trolling vane and fish-line release device for down-rigging a fish-line for deep water trolling, comprising,
a vane having a nose, tail, top and a bottom,
attaching means adjacent said nose for securing a down-rigger to lower said vane in the water
attaching means on said vane bottom adjacent said nose for attaching a weight to sink said vane in the water,
a release device for releasably interconnecting a down-rigger and said vane to a fish-line comprising,
a leg having attaching means for connecting said leg to one said down-rigger vane and fish-line,
a prong on said leg extending at an angle from said leg adjacent one said end of said leg;
said prong having a cantilevered outer end;
a spring arm on said leg;
said spring arm having a looped outer end transversely engaging said cantilevered outer end of said prong;
said spring arm on said leg triangulating from a point on said leg remote to said prong to its said looped outer end engaging said prong at its said outer cantilevered end;
said leg, prong and spring arm thereby forming an enclosure for retaining an eye on said prong connected on one of the fish-line and down-rigger vane to interconnect the fish-line with the down-rigger vane,
light pull by a bait transferred to said spring arm from an eye on said prong being resisted by the transverse engagement between said looped end of said spring arm and said cantilevered end of said prong;
said spring arm being torsionally elastic to reflex to locate its said looped outer end outwardly of said cantilevered outer end of said prong to provide an open space therebetween to permit the exit of an eye from said enclosure upon the heavy pull of a fish on said fish-line to separate the connection between the fishing line and the down-rigger vane.

15. A release device for releasably interconnecting a down-rigger and a fish-line comprising, a leg having opposite ends equipped with attaching means for connecting said leg to one said down-rigger and fish-line, a prong on said leg extending at an angle from said leg adjacent one said end of said leg;

said prong having a cantilevered outer end;

a spring arm on said leg;

said spring arm having a looped outer end transversely engaging said cantilevered outer end of said prong;

said spring arm on said leg triangulating from a point on said leg remote to said prong to its said looped outer end engaging said prong at its said outer cantilevered end;

said leg, prong and spring arm thereby forming an enclosure for retaining an eye on said prong connected on the other of the fish-line and down-rigger, light pull by a bait transferred to said spring arm from an eye on said prong being resisted by the transverse engagement between said looped end of said spring arm and said cantilevered end of said prong;

said spring arm being torsionally elastic to flex to locate its said looped outer end outwardly of said cantilevered outer end of said prong to provide an open space therebetween to permit the exit of an eye from said enclosure upon the heavy pull of a fish on said fish-line to separate the connection between the fishing line and the down-rigger.

16. A device for releasably interconnecting a down-rigger line having a sinker weight and a fish line having a bait for sinking the fish line and bait to a desired depth and for releasing the fish line and bait from the down-rigger line and sinker weight upon a fish taking the bait and exerting a pull thereon comprising, a leg having opposite ends equipped with attaching means for connecting said leg in one line;

a prong extending at an angle from said leg adjacent one said end of said leg terminating in a cantilevered outer end spaced from said leg, said prong being adapted to engage a ring on the other line to interconnect the fish and down-rigger lines;

a spring arm on said leg adjacent said other end of said leg terminating in a looped outer end slidably engaging said prong adjacent its said cantilevered outer end for resiliently enclosing the ring so that a pull exerted by a fish taking the bait is exerted against said looped end of said spring arm by the ring and moves said looped outer end of said spring arm off said cantilevered outer end of said prong and allows the ring to escape separating the connection between the fish-line and the down-rigger line.

* * * * *